United States Patent
Kawase

(10) Patent No.: US 10,069,130 B2
(45) Date of Patent: Sep. 4, 2018

(54) SEALED BATTERY AND MANUFACTURING METHOD OF SEALED BATTERY

(71) Applicant: Satomi Kawase, Miyoshi (JP)

(72) Inventor: Satomi Kawase, Miyoshi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 64 days.

(21) Appl. No.: 14/430,654

(22) PCT Filed: Dec. 16, 2013

(86) PCT No.: PCT/IB2013/002762
§ 371 (c)(1),
(2) Date: Mar. 24, 2015

(87) PCT Pub. No.: WO2014/102578
PCT Pub. Date: Jul. 3, 2014

(65) Prior Publication Data
US 2015/0229006 A1 Aug. 13, 2015

(30) Foreign Application Priority Data

Dec. 27, 2012 (JP) ................................ 2012-284941

(51) Int. Cl.
*H01M 2/34* (2006.01)
*H01M 2/26* (2006.01)
*H01M 2/02* (2006.01)

(52) U.S. Cl.
CPC ........... *H01M 2/345* (2013.01); *H01M 2/263* (2013.01); *H01M 2/021* (2013.01);
(Continued)

(58) Field of Classification Search
CPC ...... H01M 2/345; H01M 2/263; H01M 2/021; H01M 2/0217
See application file for complete search history.

(56) References Cited

U.S. PATENT DOCUMENTS 5,376,467 A * 12/1994 Abe ........................ H01M 2/34
429/163
6,242,126 B1 6/2001 Mori et al.
(Continued)

FOREIGN PATENT DOCUMENTS

CN 1200199 A 11/1998
CN 1677708 A 10/2005
(Continued)

*Primary Examiner* — Helen Oi K Conley
(74) *Attorney, Agent, or Firm* — Sughrue Mion, PLLC

(57) ABSTRACT

A sealed battery (1) is provided with a current interrupting mechanism (62) that interrupts current that flows through an electrode body (10) when an internal pressure (F) of a battery case (80) exceeds an operating pressure (G). The current interrupting mechanism includes a movable member (64) that includes a moving portion (64A) that moves with a rise in the internal pressure, and a conductive member (63) that is electrically connected to the electrode body. The conductive member (63) includes a protruding portion (63A) that protrudes toward the moving portion. A weld (PT) created by welding using an energy beam is interposed between the protruding portion and the moving portion. The conductive member has, around the protruding portion, an annular groove (63BG) that fractures in an annular shape surrounding the weld when the internal pressure exceeds the operating pressure. The protruding portion elastically pushes against the moving portion via the weld.

4 Claims, 15 Drawing Sheets

(52) U.S. Cl.
CPC ...... *H01M 2/0217* (2013.01); *H01M 2200/20* (2013.01); *Y10T 29/4911* (2015.01)

(56) References Cited

U.S. PATENT DOCUMENTS

| | | | |
|---|---|---|---|
| 6,346,344 B1 * | 2/2002 | Song | H01M 2/0456 429/53 |
| 2005/0214634 A1 | 9/2005 | Kim | |
| 2009/0148767 A1 | 6/2009 | Yamashita et al. | |
| 2010/0233529 A1 | 9/2010 | Nansaka et al. | |

FOREIGN PATENT DOCUMENTS

| | | |
|---|---|---|
| CN | 101459234 A | 6/2009 |
| EP | 2 472 634 A1 | 7/2012 |
| JP | 10-021892 A | 1/1998 |
| JP | 2009-140870 A | 6/2009 |
| JP | 2010-212034 A | 9/2010 |
| JP | 2012-038529 A | 2/2012 |

\* cited by examiner

F I G . 1
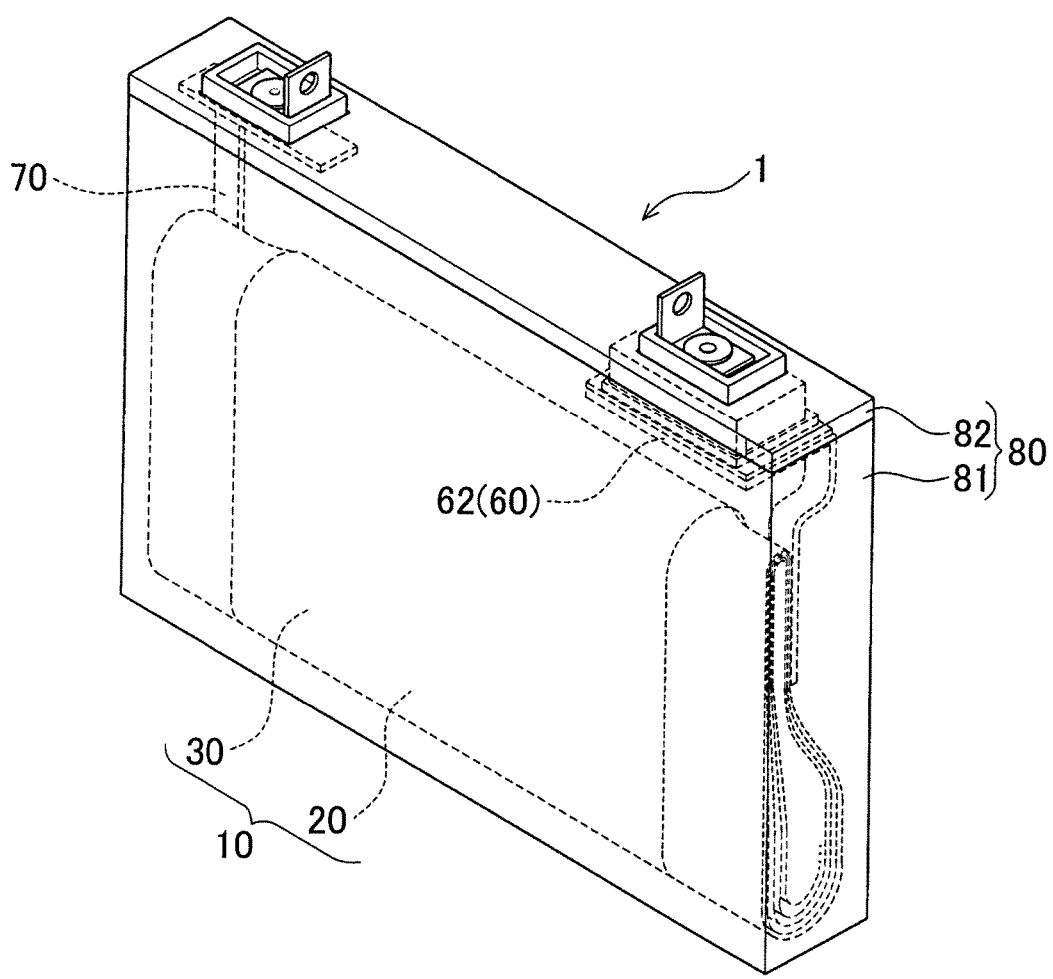

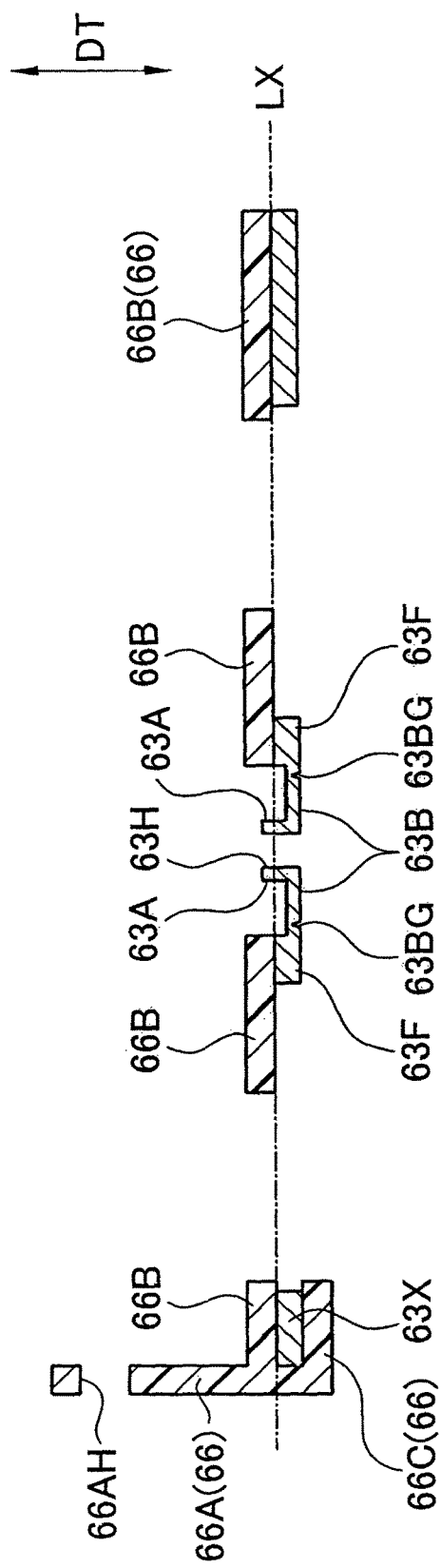

SEALED BATTERY AND MANUFACTURING METHOD OF SEALED BATTERY

BACKGROUND OF THE INVENTION

1. Field of the Invention

The invention relates to a sealed battery (hereinafter also simply referred to as "battery") provided with a current interrupting mechanism that activates when an internal pressure of a battery case exceeds an operating pressure, and interrupts, current flowing to an electrode body. The invention also relates to a manufacturing method of this sealed battery.

2. Description of Related Art

In recent years, rechargeable batteries have come to be used as power supplies for driving vehicles such as hybrid vehicles and electric vehicles, and portable electronic devices such as notebook computers and video camcorders and the like. Japanese Patent Application Publication No. 2010-212034 (JP 2010-212034 A) describes one such battery that is provided with a pressure-type current interrupting mechanism, in which a reversing plate and a collector that form this current interrupting mechanism are welded together by a laser welding method. With the battery described in JP 2010-212034 A, a flat plate-like portion of the reversing plate is placed into contact with a flat plate-like portion of the collector, and the two are welded together (see JP 2010-212034 A; FIGS. 3 and 5).

However, when manufacturing the battery, the position of the reversing plate (a movable portion that will be described later) with respect to the collector (a conductive member that will be described later) may be offset in a thickness direction of the reversing plate (i.e., a direction perpendicular to abutting surfaces that abut against one another), due to dimensional tolerance and the like of a plurality of members that form the current interrupting mechanism. For example, if the contact between the reversing plate and the collector is insufficient due to an offset in the thickness direction of the reversing plate, a gap may form between the two, which may make it difficult to weld them together using an energy beam, and consequently, the joint strength may decrease. Conversely, if the reversing plate is firmly abutted against the collector due to an offset, deformation may occur, making it difficult to weld the collector plate and the reversing plate together with flat surfaces, and as a result, a gap may be end up being formed between the two. In this case as well, it is difficult to suitably weld the two together using an energy beam, so the weld strength may decrease. In particular, when the thickness of the reversing plate or the collector is reduced (i.e., made thin) in order to make the current interrupting mechanism smaller or the battery lighter, deformation occurs even more easily, so it becomes even more difficult to ensure the abutting surfaces.

SUMMARY OF THE INVENTION

The invention thus provides a sealed battery in which a poor weld between a conductive member and a movable member is avoided. The invention also provides a manufacturing method of a sealed battery in which a conductive member and a movable member that form a current interrupting mechanism are suitably welded using an energy beam.

A first aspect of the invention relates to a sealed battery that includes an electrode body that has an electrode plate; a battery case that encloses this electrode body; and a current interrupting mechanism that interrupts current that flows through the electrode body when an internal pressure of the battery case exceeds an operating pressure. The current interrupting mechanism has a movable member that includes a moving portion that moves with a rise in the internal pressure in the battery case and a conductive member that is electrically connected to the electrode plate of the electrode body. The conductive member includes a protruding portion that protrudes toward the moving portion. A weld created by welding using an energy beam is interposed between the protruding portion and the moving portion. The conductive member has, around the protruding portion, an annular groove that fractures in an annular shape surrounding the weld when the internal pressure exceeds the operating pressure. The protruding portion elastically pushes against the moving portion via the weld. The annular shape includes a circular shape and a shape other than the circular shape.

In the sealed battery described above, the protruding portion elastically pushes the moving portion via the weld. In this battery, before welding, even if the protruding portion and the moving portion are offset in the abutting direction due to dimensional tolerance or the like of the members that form the current interrupting mechanism, the protruding portion is welded using an energy beam while being reliably abutted against the moving portion. Therefore, with this battery, the reliability with which the conductive member and the movable member that form the current interrupting mechanism are reliably welded together is high. Also, even if the movable member described above is offset, the moving portion will not easily abut against a portion of the conductive member other than the protruding portion. Therefore, deformation of the conductive member due to this abutment is avoided, so stress applied to the annular groove is able to be reduced, and a malfunction of the current interrupting mechanism is able to be inhibited. A laser beam and an electron beam are some examples of the energy beam.

Further, in the sealed battery described above, the annular groove may have a circular shape, and the protruding portion may have a circular shape that is concentric with the annular groove.

In the battery described above, the annular groove has a circular shape, and the protruding portion has a circular shape that is concentric with the annular groove, so the distance between the annular groove and the protruding portion is able to be the same along the entire circumference. Therefore, when the internal pressure in the battery case rises and the protruding portion separates from the moving portion such that a fracture occurs in a portion of the annular groove, the annular groove is able to be made to reliably fracture from here along the entire circumference. Thus, the battery is able to be such that current that flows to the electrode body is able to be reliably interrupted when the internal pressure of the battery case exceeds the operating pressure.

Moreover, in the sealed battery described above, the conductive member may include, in the circular-shaped protruding portion, a circular through-hole in which this protruding portion is positioned on a peripheral edge.

In the battery described above, the through-hole is formed in the circular-shaped protruding portion, so the weld state of the weld is able to be easily checked optically, e.g., visually, through this through-hole. Also, the protruding portion of the conductive member of this battery is able to elastically move a large amount in the abutting direction of the protruding portion and the moving portion, compared with when a through-hole is not provided in the protruding portion. Therefore, during manufacturing, the protruding portion is able to be more reliably abutted against the moving portion and welded thereto.

Furthermore, a second aspect of the invention relates to a manufacturing method of a sealed battery that is provided with an electrode body having an electrode plate, a battery case that encloses the electrode body, and a current interrupting mechanism that interrupts current flowing through, the electrode body when an internal pressure of the battery case exceeds an operating pressure, the current interrupting mechanism having a movable member that includes a moving portion that moves with a rise in the internal pressure in the battery case, and a conductive member that is electrically connected to the electrode plate of the electrode body, the conductive member including a protruding portion that protrudes toward the moving portion, a weld created by welding using an energy beam being interposed between the protruding portion and the moving portion, and the conductive member having, around the protruding portion, an annular groove that fractures in an annular shape surrounding the weld when the internal pressure exceeds the operating pressure. This manufacturing method includes an abutting process for elastically abutting the protruding portion against the moving portion, and a welding process for welding the moving portion to the protruding portion by emitting the energy beam at the protruding portion.

The manufacturing method of the sealed battery described above includes the abutting process and the welding process, so even if there is offset in the abutting direction of the protruding portion and the moving portion due to dimensional tolerance or the like of the members that form the current interrupting mechanism, this offset is absorbed so the protruding portion of the positive conductive member is able to abut against the moving portion. Accordingly, a battery in which the conductive member and the movable member are suitably welded using a laser beam is able to be manufactured. Moreover, the protruding portion that protrudes from the area around the protruding portion is provided, so the portion of the positive conductive member that abuts against the moving portion is limited to this protruding portion. As a result, the protruding portion of the conductive member is able to be reliably abutted against the moving portion of the movable member.

Further, in the manufacturing method described above, the annular groove may have a circular shape, and the protruding portion may have a circular shape that is concentric with the annular groove.

In the manufacturing method of the battery described above, the annular groove has a circular shape, and the protruding portion has a circular shape that is concentric with the annular groove, so the distance between the annular groove and the protruding portion is able to be the same along the entire circumference. Therefore, when the internal pressure in the battery case rises and the protruding portion separates from the moving portion such that a fracture occurs in a portion of the annular groove, the annular groove is able to be made to reliably fracture from here along the entire circumference. Thus, a battery in which current that flows to the electrode body is able to be reliably interrupted when the internal pressure of the battery case exceeds the operating pressure is able to be manufactured.

Also, in the manufacturing method described above, the conductive member may include, in the circular-shaped protruding portion, a circular through-hole in which this protruding portion is positioned on a peripheral edge of the circular through-hole.

With the manufacturing method described above, the through-hole is formed in the annular-shaped protruding portion, so the protruding portion is able to elastically move a large amount in the abutting direction of the protruding portion and the moving portion, compared with when a through-hole is not provided in the protruding portion. Therefore, in the abutting process, the protruding portion is able to be reliably abutted against the moving portion. Also, when the moving portion is, welded to the protruding portion in the welding process, the state of the weld is able to be easily checked optically, e.g., visually, through this through-hole.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a perspective view of a battery according to one example embodiment of the invention;

FIG. 7 is an explanatory view (an end view taken along line VII-VII of FIG. 6B) of the manufacturing method of the battery according to the example embodiment;

DETAILED DESCRIPTION OF EMBODIMENTS

Figure 2:
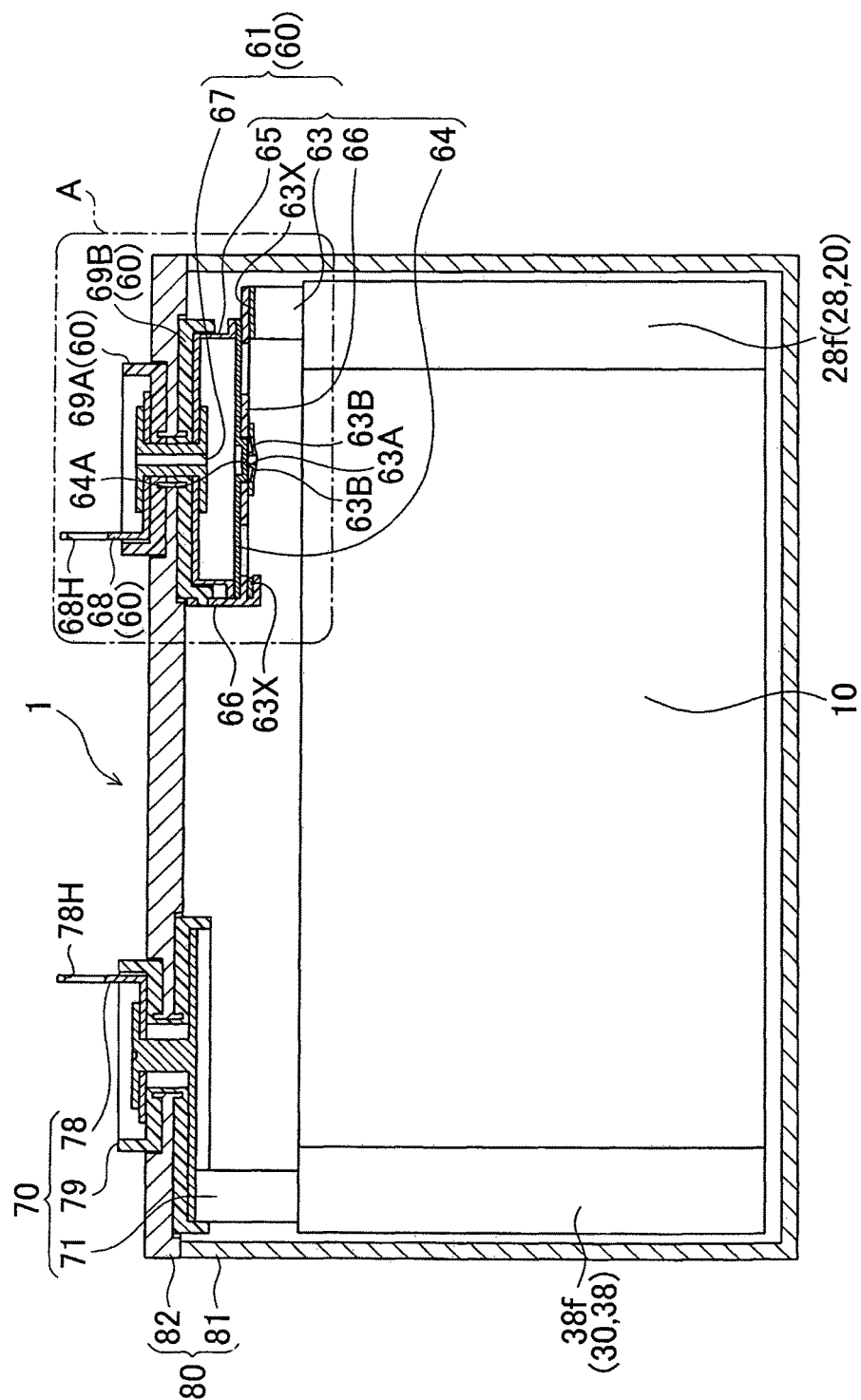
FIG. 2 is a partially broken perspective view of the battery according to the example embodiment.

Next, example embodiments of the invention will be described with reference to the accompanying drawings. First, a battery 1 according to the example embodiment will be described. This battery 1 is a sealed lithium-ion secondary battery that includes an electrode body 10 that has a positive plate 20 and a negative plate 30, a battery case 80 that encloses this electrode body 10, and a positive terminal structure 60 that includes a current interrupting mechanism 62 (see FIG. 1). This battery 1 also includes an electrolyte, not shown, that is impregnated in the electrode body 10, and a negative terminal structure 70. Of these, the current interrupting mechanism 62 of the positive terminal structure 60 interrupts current flowing through the electrode body 10 when an internal pressure F of the battery case 80 exceeds an operating pressure G.

The battery case 80 of the battery 1 has a case main body member 81 that has an opening, and a sealing lid 82. Of these, the sealing lid 82 has rectangular plate shape, and closes off the opening of the case main body member 81. This sealing lid 82 is welded to this case main body member 81.

Meanwhile, the strip-shaped positive plate 20 and negative plate 30 of the electrode body 10 are rolled in a flat-shape via a strip-shaped separator, not shown, made of polyethylene (see FIG. 1). The positive plate 20 of the electrode body 10 is joined to a positive internal terminal structure 61 (a positive conductive member 63), which will be described later, of the positive terminal structure 60, and the negative plate 30 of the electrode body 10 is joined to a negative internal terminal member 71, which will be described later, of the negative terminal structure 70 (see FIG. 2). The positive plate 20 of the electrode body 10 carries a positive-electrode active material layer, not shown, on both surfaces of a strip-shaped positive foil 28, except for a positive lead portion 28f along one side of the positive foil 28. Also, the negative plate 30 carries a negative-electrode active material layer, not shown, on both surfaces of a strip-shaped negative foil 38, except for a negative lead portion 38f along one side of the negative foil 38.

Also, the negative terminal structure 70 mainly includes the negative internal terminal member 71 that is made of copper and is positioned, inside the battery case 80, a negative external terminal member 78 that is also made of copper but is positioned outside the battery case 80, and a gasket 79 that is made of insulating resin (see FIG. 2). Of these, the negative external terminal member 78 that is bent in a crank-shape has a through-hole 78H for fastening a bus bar or the like with a bolt on a tip end side. Also, the gasket 79 is interposed between the negative external terminal member 78 and the negative internal terminal member 71, and the battery case 80, thereby insulating the negative external terminal member 78 and the negative internal terminal member 71 from the battery case 80. Also, the negative internal terminal member 71 is joined and electrically connected to the negative lead portion 38f of the negative plate 30 inside the battery case 80, while passing through the sealing lid 82 of the battery case 80 and crimping the negative external terminal member 78 and the gasket 79 to the sealing lid 82, and being electrically connected to the negative external terminal member 78.

On the other hand, the positive terminal structure 60 mainly includes i) the positive internal terminal structure 61 that is positioned inside the battery case 80 and includes the current interrupting mechanism 62, ii) a positive external terminal member 68 that is made of aluminum and positioned outside the battery case 80, and iii) a gasket (an external gasket 69A and an internal gasket 69B) made of insulating resin (see FIG. 2). Of these, the positive external terminal member 68 that is bent in a crank-shape has a through-hole 68H for fastening a bus bar or the like with a bolt on a tip end side. Also, the external gasket 69A is positioned outside the battery case 80 and interposed between the positive external terminal member 68 and the battery case 80, thereby insulating the positive external terminal member 68 from the battery case 80. On the other hand, the internal gasket 69B is positioned inside the battery case 80 and interposed between the positive internal terminal structure 61 and the battery case 80, thereby insulating the positive internal terminal structure 61 from the battery case 80.

Figure 3:
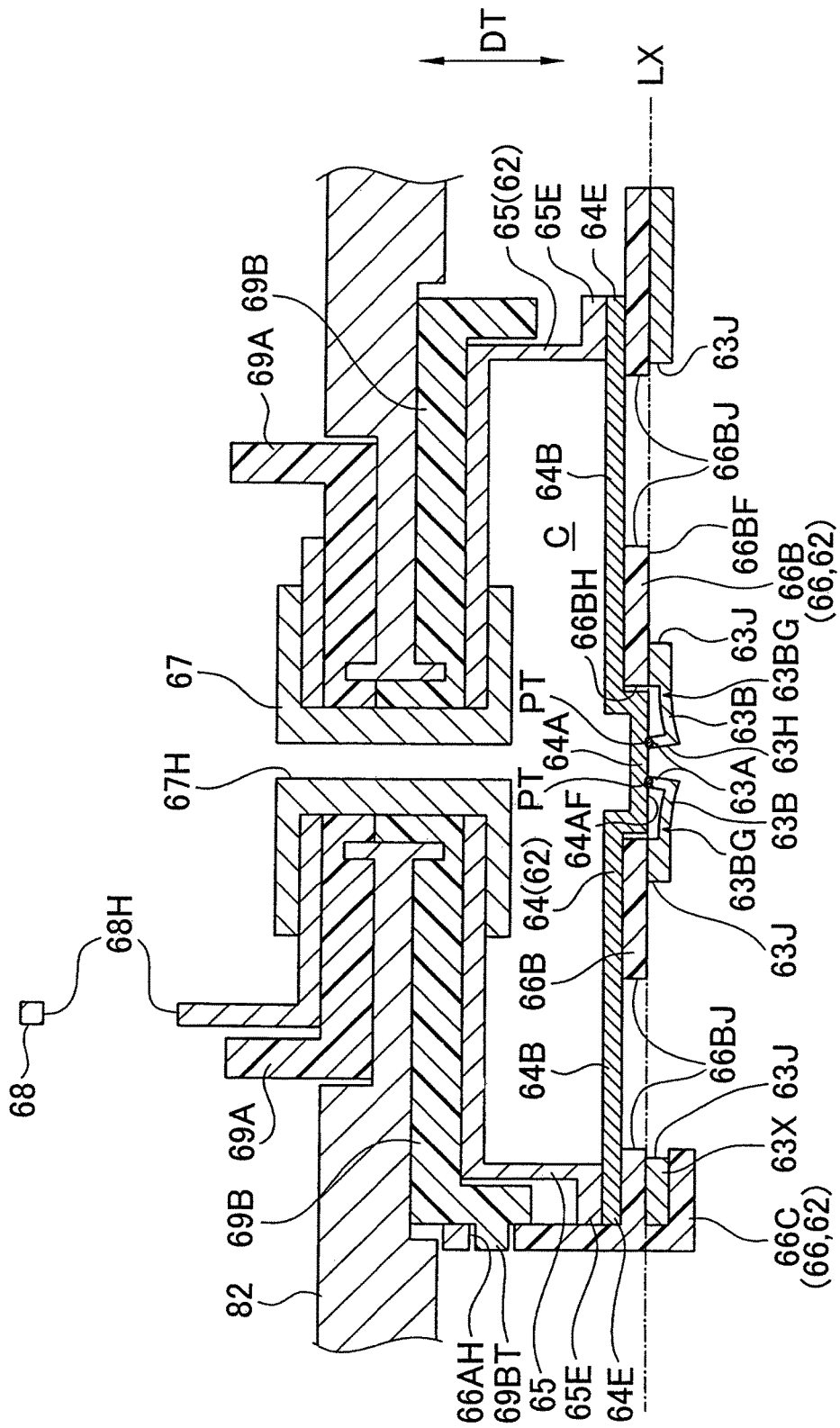
FIG. 3 is a partial enlarged end view (portion A in FIG. 2) of the battery according to the example embodiment.

The positive internal terminal structure 61 includes a positive conductive member 63, a flat plate-like diaphragm 64, a rectangular recessed transfer member 65, and a crimping member 67, all of which are made of aluminum, as shown in FIGS. 2 and 3. The positive internal terminal structure 61 also has an enclosing member 66 that is made of resin and encloses a main body portion 63X of the positive conductive member 63, which will be described later, the diaphragm 64, the transfer member 65, and the internal gasket 69B.

Of these, the crimping member 67 passes through a through-hole 82H of the sealing lid 82, and crimps the transfer member 65, the positive external terminal member 68, and the gaskets 69A and 69B to the sealing lid 82 (see FIG. 3). Moreover, the crimping member 67 electrically connects the transfer member 65 to the positive external terminal member 68.

Figure 5A:
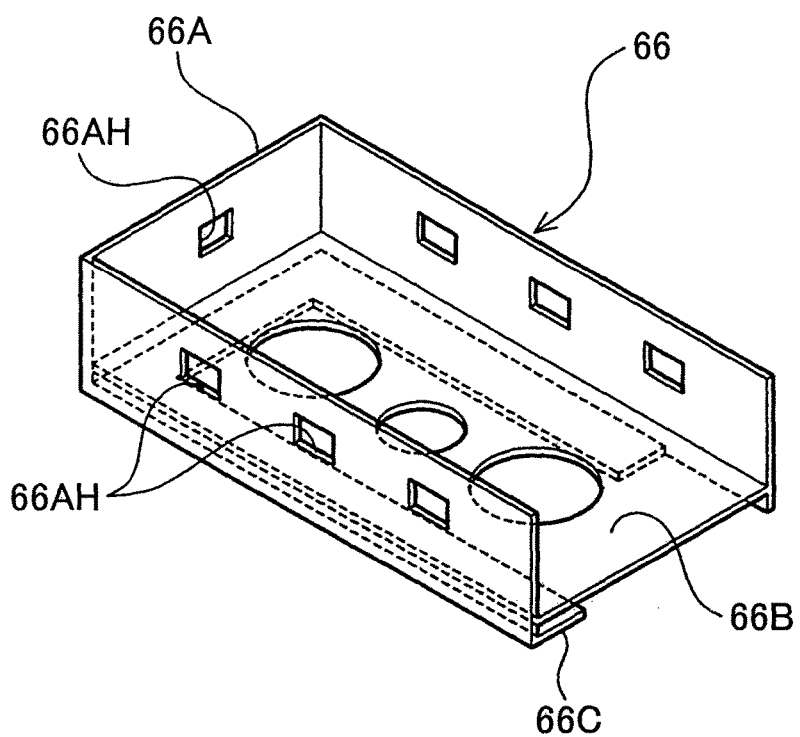
FIGS. 5A and 5B are explanatory views of an enclosing member according to the example embodiment.
Figure 5B:
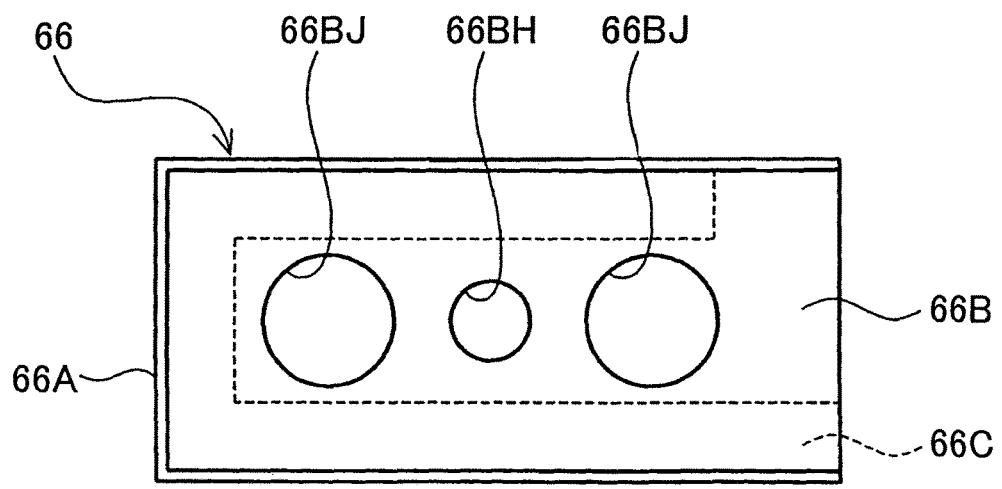

Also, the enclosing member 66 has a U-shaped wall portion 66A, a rectangular plate-like bottom plate portion 66B that is surrounded on three sides by this wall portion 66A, and a generally U-shaped plate-like guide portion 66C that extends parallel to the bottom plate portion 66B from the wall portion 66A, as shown in FIG. 5A. Of these, the wall portion 66A has a plurality of rectangular wall portion through-holes 66AH. Protruding portions 69BT that protrude from an outer surface of the internal gasket 69B, as shown in FIG. 3, fit into these wall portion through-holes 66AH. Also, the bottom plate portion 66B has a first through-hole 66BH positioned in the center, and two second through-holes 66BJ that are positioned, one on each side, to the outside of this first through-hole 66BH, and which of the form a hole together with second through-holes 68J, that will be described later, of the positive conductive member 63. In the battery 1 according to this example embodiment, a moving portion 64A, that will be described later, of the diaphragm 64 is arranged in the first through-hole 66BH (see FIG. 3). Also, internal pressure of the battery case 80 is able to be applied upward in FIG. 3 to the diaphragm 64 through the second through-holes 66BJ.

A peripheral edge portion 65E of the transfer member 65 is joined to a peripheral edge portion 64E, which will be described later, of the diaphragm 64 in an air-tight manner. Accordingly, the transfer member 65, the diaphragm 64, and the crimping member 67 form a space C (see FIG. 3). In this example embodiment, this space C is communicated with the outside of the battery case 80 through a through-hole 67H of the crimping member 67, so the pressure in this space C is atmospheric pressure.

The diaphragm 64 includes the moving portion 64A that protrudes toward the main body portion 63X (that will be described next) side of the positive conductive member 63, and that is joined to a protruding portion 63A (that will be described next) of the positive conductive member 63 via a weld. PT, and a flat plate-like flat plate portion 64B positioned around this moving portion 64A (see FIGS. 3 and 4). With this diaphragm 64, the moving portion 64A is able to move upward in FIGS. 3 and 4 by deformation of the flat plate portion 64B. Also, in this example embodiment, the dimensions of each of the members are designed such that a main surface 64AF of the moving portion 64A of the diaphragm 64, which faces the protruding portion 63A side is positioned in a plane LX that includes an outside surface 66BF of the bottom plate portion 66B of the enclosing member 66, indicated by the alternate long and short dash line in FIG. 3. FIG. 3 is a view of a case in which the moving portion 64A is not offset in a designed abutting direction DT (that will be described later), and the main surface 64AF of the moving portion 64A viewed from the abutting direction, DT is positioned in the plane LX.

Figure 6A:
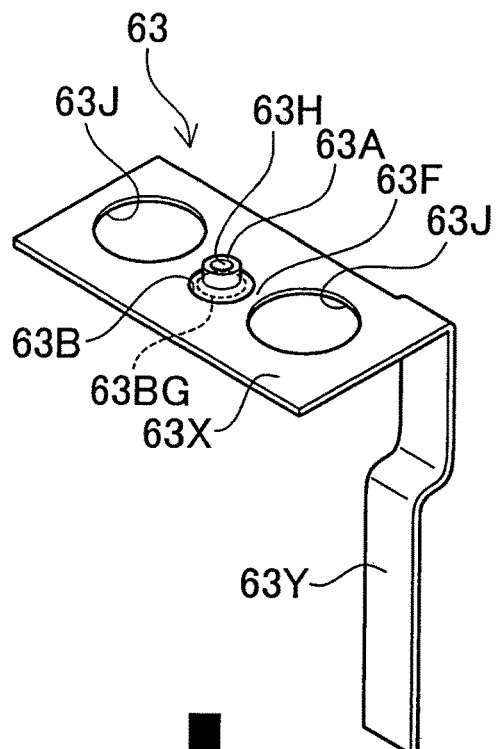
FIGS. 6A and 6B are explanatory views of a manufacturing method of the battery according to the example embodiment.
Figure 6B:
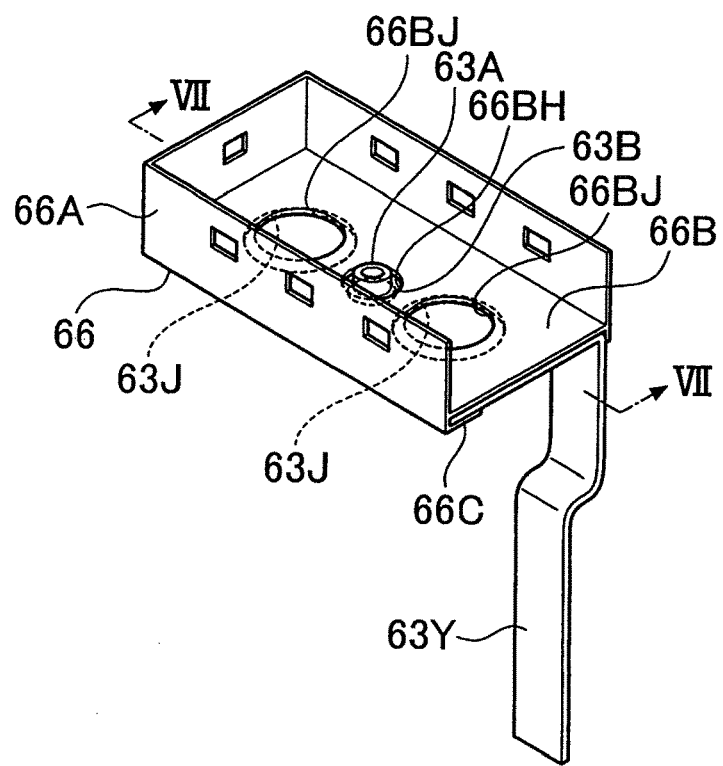

The positive conductive member 63 includes the rectangular plate-like main body portion 63X, and a band plate-like collector portion 63Y that extends downward in FIG. 6A from this main body portion 63X, as shown in FIG. 6A. Of these, the collector portion 63Y is joined and electrically connected to the positive lead portion 28f of the positive plate 20 (see FIG. 2).

Meanwhile, the main body portion 63X includes a circular first through-hole 63H positioned in the center, an annular protruding portion 63A that has a circular shape and is formed on a peripheral edge of this first through-hole 63H, and that protrudes toward the moving portion 64A side (upward in FIGS. 6A and 7) of the diaphragm 64 from the main body portion 63X, and an exposed portion 63B that is positioned around this protruding portion 63A and is exposed from the enclosing member 66, and shown in FIGS. 2, 3, 6B, and 7. Also, two second through-holes 63J that pass through the main body portion 63X itself are bored to the outsides of the exposed portion 63B in this main body portion 63X. Also, a portion of the main body portion 63X between the second through-holes 63J and the exposed portion 63B is made a flat plate portion 63F. Of these, the exposed portion 63B has a circular-shaped annular groove 63BG cut out in a downward V-shape (i.e., downward in FIGS. 6A and 7). Also, this exposed portion 63B is depressed downward in FIG. 7, and is thus thinner than the flat plate portion 63F. Further, the exposed portion 63B is thinner than the diaphragm 64, and thus elastically deforms more easily than the diaphragm 64 (i.e., the moving portion 64A). The annular protruding portion 63A has a circular shape that is concentric with the annular groove 63BG (see FIG. 6A), and is welded to the moving portion 64A side of the diaphragm 64 described above via the weld PT by welding using a laser beam LB that will be described later, as shown in FIG. 3.

In the battery 1, the protruding portion 63A elastically pushes against the moving portion 64A of the diaphragm 64 via the weld PT. More specifically, as shown in FIG. 3, the protruding portion 63A is welded to the moving portion 64A while the exposed portion 63B around the protruding portion 63A is bent downward in FIG. 3. The exposed portion 63B of the positive conductive member 63 before the diaphragm 64 is connected (when it is in a free state) has a flat plate shape that extends left and right in the drawing, as shown in FIG. 7, and the protruding portion 63A elastically pushes the moving portion 64A upward in FIG. 3 by a reaction force corresponding to the amount that the exposed portion 63B elastically deforms (bends) downward in FIG. 3.

Figure 4:
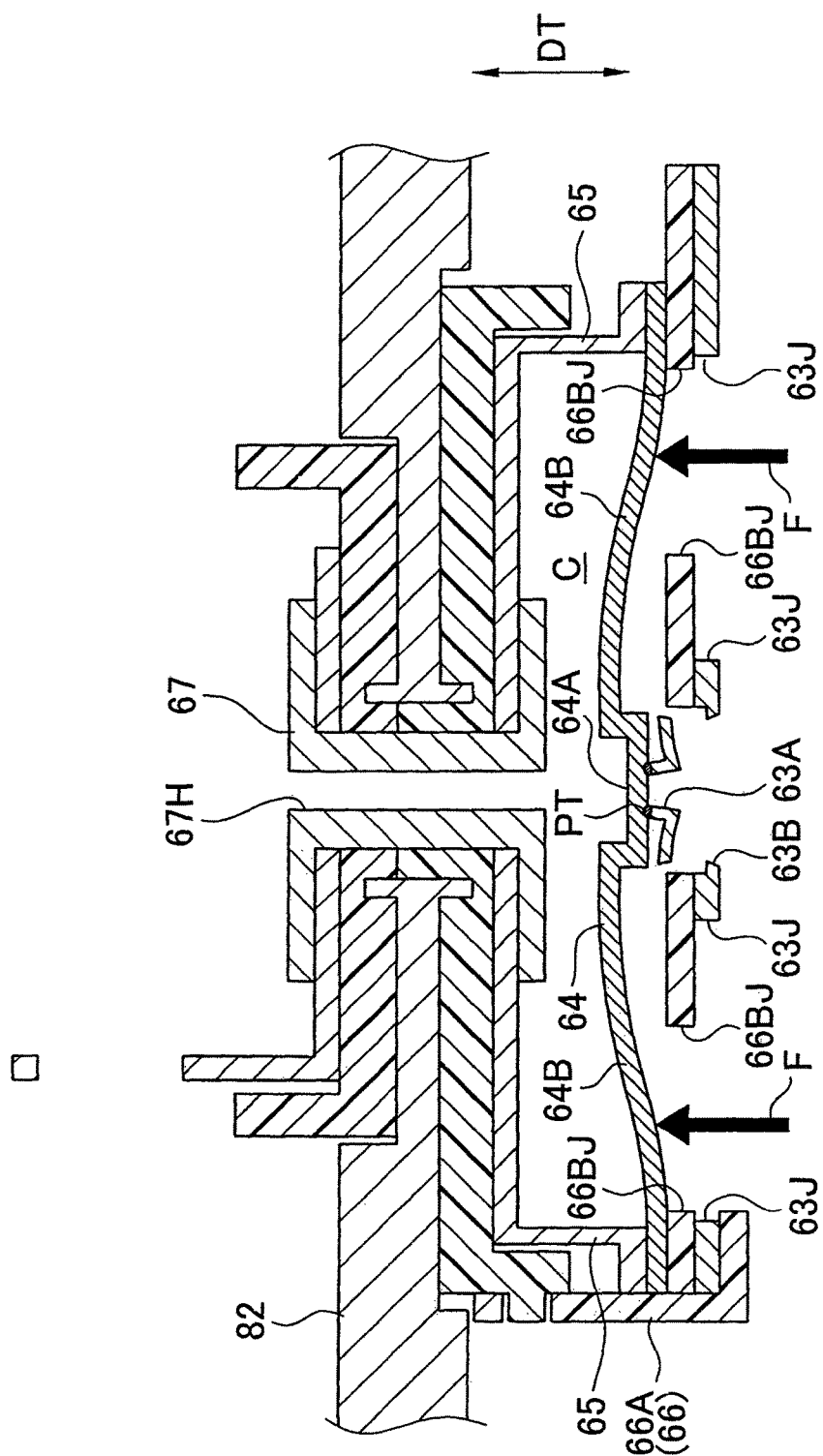
FIG. 4 is an explanatory view of the current interrupting mechanism of the example embodiment.

Also, with the battery 1 according to this example embodiment, the positive conductive member 63, the diaphragm 64, the transfer member 65, and the enclosing member 66, of the positive internal terminal structure 61 described above, form the current interrupting mechanism 62 that interrupts current flowing through the electrode body 10 when the internal pressure F of the battery case 80 increases. More specifically, when the internal pressure F of the battery case 80 rises and exceeds the operating pressure G (i.e., F>G) due to overcharging of the battery 1, for example, the internal pressure F of the battery 1 is applied from below in FIG. 4 to the diaphragm 64 through the second through-holes 66BJ of the enclosing member 66 and the second through-holes 63J of the main body portion 63X of the positive conductive member 63 (while atmospheric pressure is applied from above in FIG. 4), as shown in FIG. 4. When this internal pressure F rises, the moving portion 64A of the diaphragm 64 is lifted upward in FIG. 4 by the difference in air pressure from the space C. With this, the protruding portion 63A of the positive conductive member 63 is pulled upward in FIG. 4 via the weld PT. Then when the internal pressure F exceeds the operating pressure G (i.e., F>G), the protruding portion 63A is pulled even further upward in the drawing, and the annular groove 63BG provided on the exposed portion 63B of the positive conductive member 63 fractures. This fracturing interrupts current flowing to the electrode body 10 along a path of (positive external terminal member 68)-(crimping member 67)-(transfer member 65)-(diaphragm 64)-(positive conductive member 63), such that charging (overcharging) of the battery 1 stops.

With the battery 1 according to this example embodiment, the annular groove 63BG has a circular shape, and the protruding portion 63A has a circular shape that is concentric with this annular groove 63BG, so the distance between the annular groove 63BG and the protruding portion 63A is able to be the same along the entire circumference. Therefore, when the internal pressure F in the battery case 80 rises and the protruding portion 63A separates from the moving portion 64A such that a fracture occurs in a portion of the annular groove 63BG, the annular groove 63BG is able to be made to reliably fracture from here along the entire circumference. Thus, the battery 1 in which current that flows to the electrode body 10 is able to be reliably interrupted when the internal pressure F of the battery case 80 exceeds the operating pressure G is able to be manufactured.

Also, with this battery 1, the first through-hole 63H is formed in the annular protruding portion 63A, so the weld state of the weld PT is able to be easily checked optically, e.g., visually, through this first through-hole 63H.

Next, a manufacturing method of the battery 1 according to the example embodiment will be described with reference to the drawings. First, the positive plate 20 and the negative plate 30 that form the electrode body 10 are each manufactured by a well-known method. Then, a separator, not shown, is interposed between the positive plate 20 and the negative plate 30, and these are rolled up in a cylindrical shape. In the electrode body 10, the positive plate 20 and the negative plate 30 are arranged and rolled such that the positive lead portion 28f of the positive plate 20 is positioned on one side in a direction parallel to the rolling axis, and the negative lead portion 38f of the negative plate 30 is positioned on the opposite side (i.e., the other side). After rolling, the flat rolled electrode body 10 that has a flat horizontal cross-section is prepared by pressing and crushing the cylindrical surface from both sides.

Meanwhile, the main body portion 63X of the positive conductive member 63 shown in FIG. 6A is fixed to the enclosing member 66. More specifically, the main body portion 63X of the positive conductive member 63 is arranged between, and adhered to, the bottom plate portion 66B and the guide portion 66C of the enclosing member 66, such that the positive conductive member 63 is fixed to the enclosing member 66' (see FIG. 6B). At this time, the protruding portion 63A and the exposed portion 63B of the positive conductive member 63 are exposed from the enclosing member 66 through the first through-hole 66BH of the enclosing member 66 (see FIGS. 6B and 7). Also, the second through-holes 63J of the positive conductive member 63, and the second through-holes 66BJ of the enclosing member 66 corresponding to the second through-holes 63J of the positive conductive member 63, are communicated together (see FIGS. 6B and 7). As shown in FIG. 7 that is an end view taken along line VII-VII of the positive conductive member 63 that is fixed to the enclosing member 66, the protruding portion 63A of the positive conductive member 63 protrudes upward in FIG. 7 beyond the plane LX indicated by the alternate long and short dash line. The protruding dimension that the protruding portion 63A protrudes from the plane LX is greater than a maximum value of offset in the abutting direction DT assumed for the moving portion 64A of the diaphragm 64, in an abutting process that will be described later. Also, the exposed portion 63B around this protruding portion 63A has a flat plate-shape that extends in the left-right direction in FIG. 7, in a free state.

Figure 8:
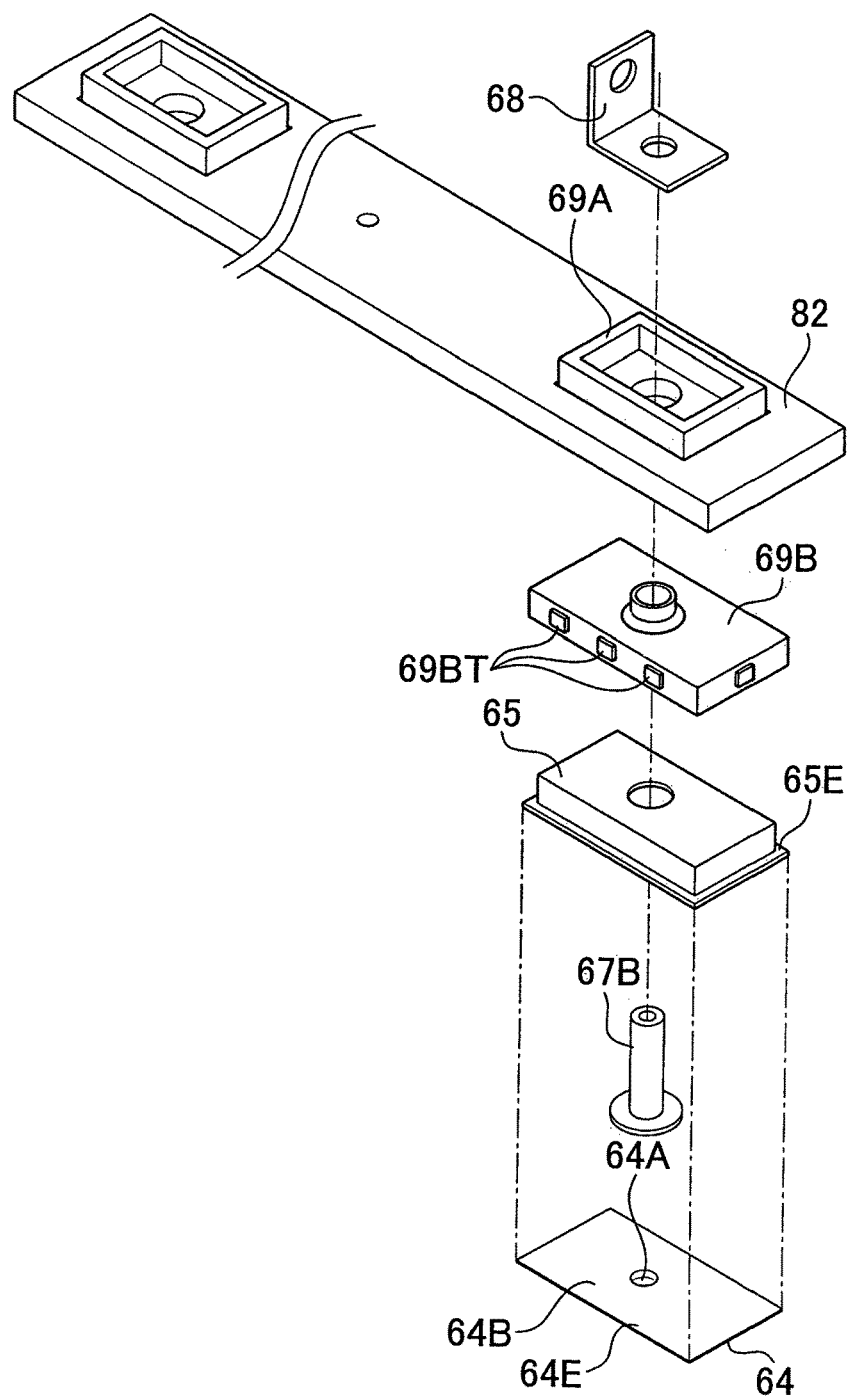
FIG. 8 is an explanatory view of the manufacturing method of the battery according to the example embodiment.

Also, as shown in FIG. 8, the transfer member 65, the positive external terminal member 68, and the internal gasket 69B are crimped to the sealing lid 82 where the external gasket 69A is arranged. More specifically, an aluminum rivet 67B that is not flared out in the radial direction at one tip end is inserted through the transfer member 65, the internal gasket 69B, the external gasket 69A (i.e., the sealing lid 82), and the positive external terminal member 68, in this order. Then, the tip end of the rivet 67B is flared out in the radial direction using a well-known method, such that the transfer member 65, the positive external terminal member 68, and the gaskets 69A and 69B are crimped to the sealing lid 82. Then, a peripheral edge portion 65E of the transfer member 65 is overlaid onto a peripheral edge portion 64E of the diaphragm 64, and these peripheral edge portions 65E and 64E are welded together.

Figure 9:
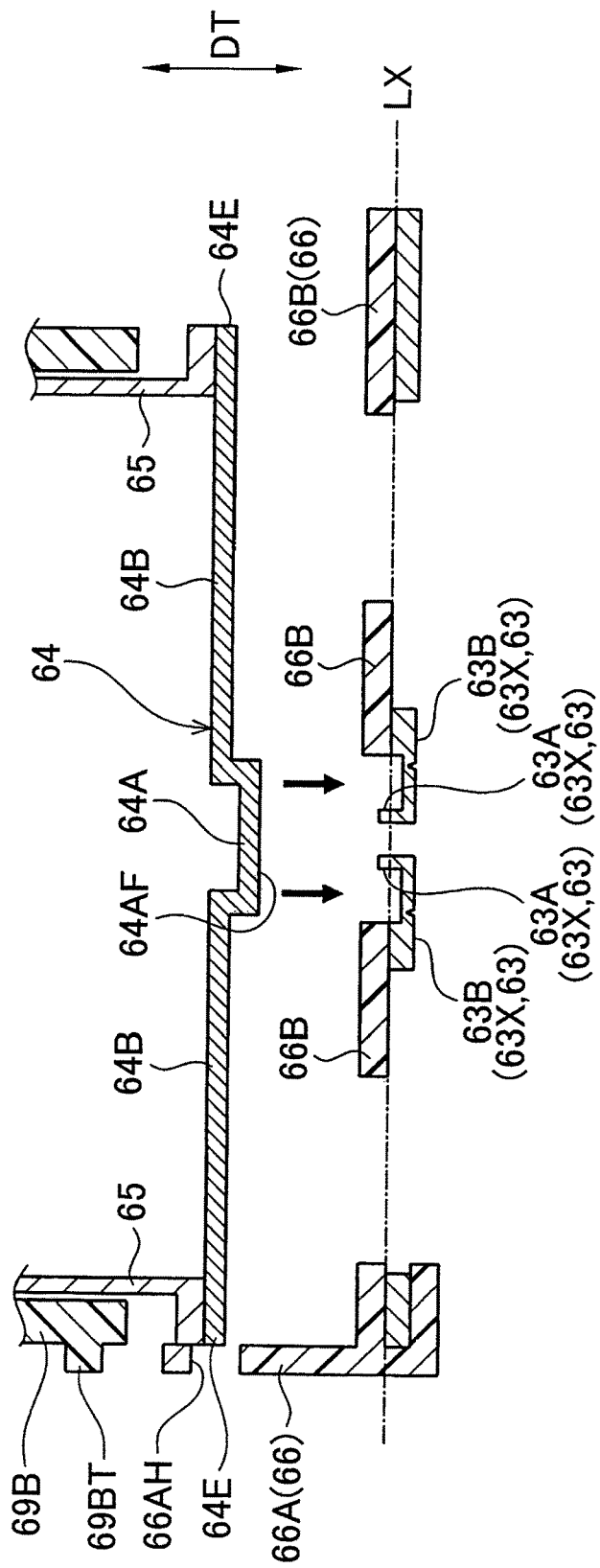
FIG. 9 is an explanatory view of an abutting process in the manufacturing method of the battery according to the example embodiment.

Continuing on, the protruding portion 63A of the positive conductive member 63 is elastically abutted against the moving portion 64A of the diaphragm 64 (an abutting process). More specifically, the main body portion 63X of the positive conductive member 63, and the diaphragm 64 are brought close to one another in the vertical direction in FIG. 9, with the protruding portion 63A and the exposed portion 63B of the positive conductive member 63, which are exposed from the bottom plate portion 66B of the enclosing member 66, covered by the main surface 64AF of the moving portion 64A of the diaphragm 64, and the protruding portion 63A is abutted against the main surface 64AF of the moving portion 64A. The vertical direction in FIG. 9 is the abutting direction DT of the protruding portion 63A and the moving portion 64A.

Figure 10:
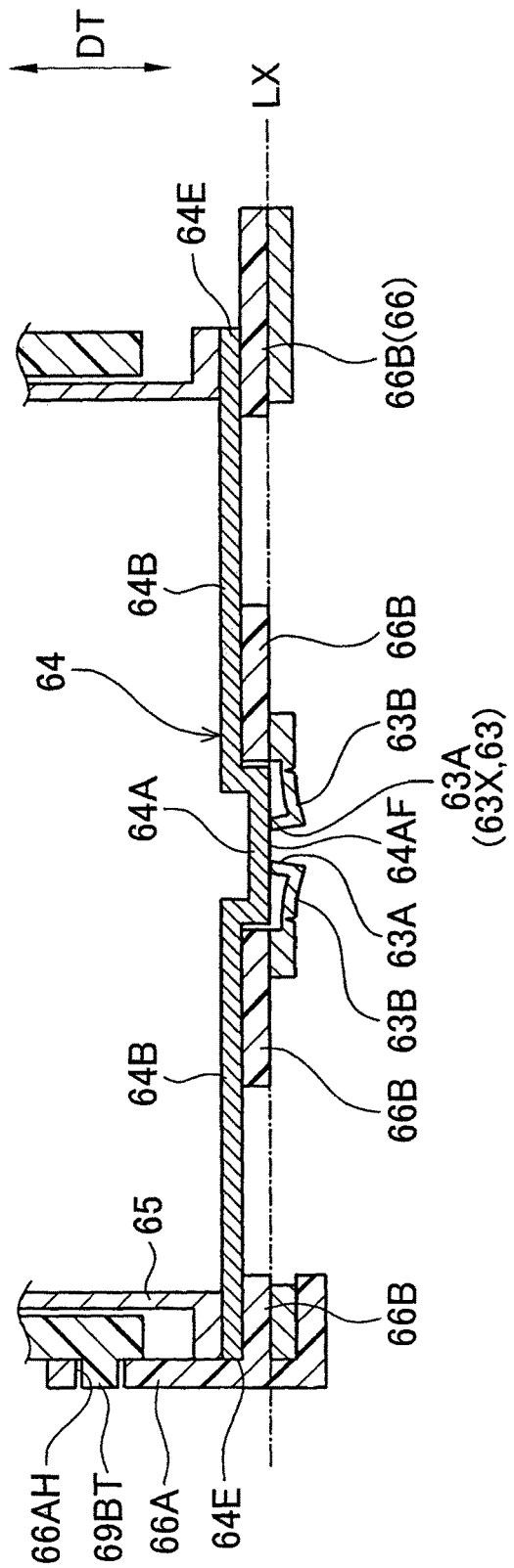
FIG. 10 is another explanatory view of the abutting process in the manufacturing method of the battery according to the example embodiment.

After the protruding portion 63A is abutted against the moving portion 64A, the main body portion 63X of the positive conductive member 63 is brought even closer to the diaphragm 64 in the abutting direction DT, and the bottom plate portion 66B of the enclosing member 66 is abutted against the flat plate portion 64B and the peripheral edge portion 64E of the diaphragm 64 (see FIG. 10). In this example embodiment, the flat plate portion 64B and the peripheral edge portion 64E of the diaphragm 64 are abutted against the bottom plate portion 66B of the enclosing member 66, and the protruding portions 69BT of the internal gasket 69B are fitted into the wall portion through-holes 66AH of the wall portion 66A of the enclosing member 66. As a result, the bottom plate portion 66B is abutted against the flat plate portion 64B and the peripheral edge portion 64E, and the enclosing member 66 is joined to the internal gasket 69B.

The exposed portion 63B is thinner than the moving portion 64A of the diaphragm 64, so as the moving portion 64A of the diaphragm 64 advances toward the positive conductive member 63 side in the abutting direction DT, the protruding portion 63A that abuts against this is pushed downward and the exposed portion 63B bends downward in FIG. 10 (see FIG. 10). As a result, the protruding portion 63A receives the reaction force of the elastic deformation (bending) generated in the exposed portion 63B, and elastically abuts against the moving portion 64A of the diaphragm 64.

The position of the diaphragm 64 with respect to the positive conductive member 63 may be offset in the abutting direction DT due to dimensional tolerance or the like of the plurality of members that make up the current interrupting mechanism 62. More specifically, the main surface 64AF of the moving portion 64A of the diaphragm 64 may be arranged offset in the abutting direction DT with respect to the plane LX described above, for example. However, in this example embodiment, an offset in the abutting direction DT is absorbed by the elastic deformation of the exposed portion 63B, so the protruding portion 63A of the positive conductive member 63 reliably abuts, against the moving portion 64A of the diaphragm 64.

Figure 11:
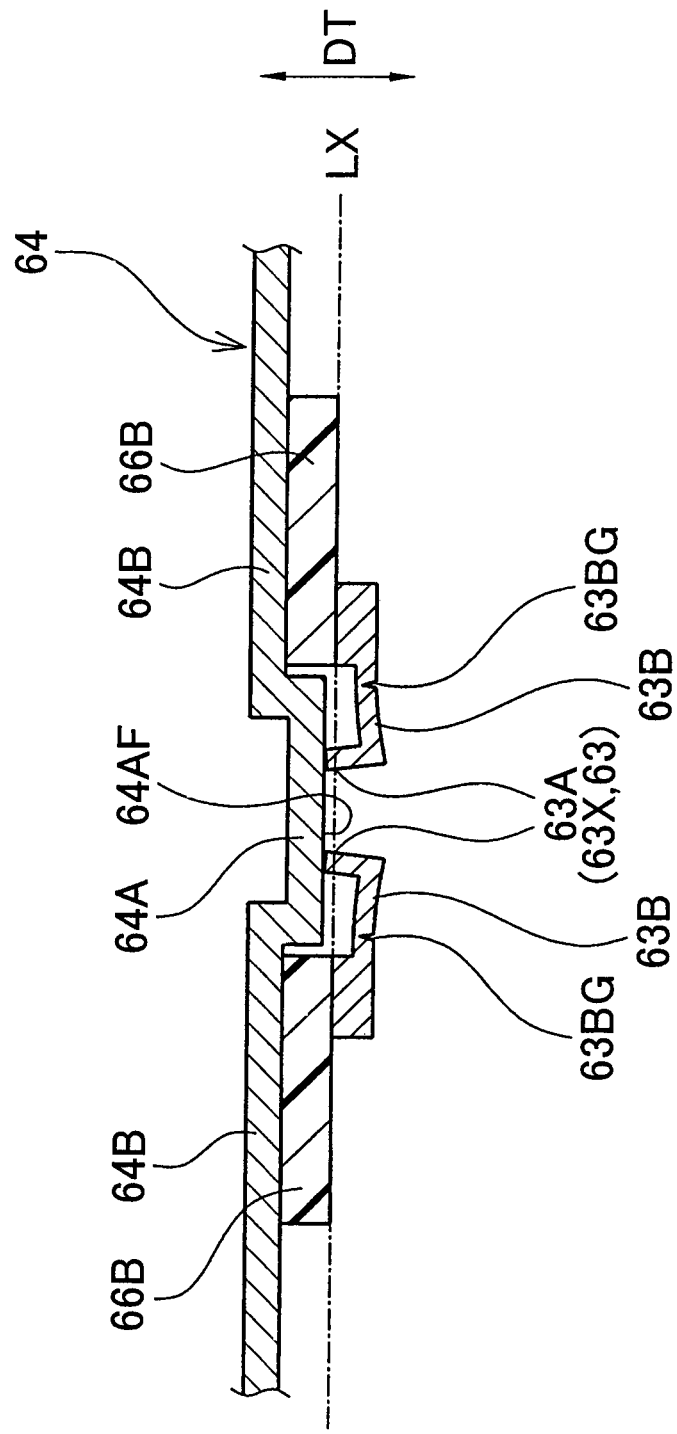
FIG. 11 is yet another explanatory view of the abutting process in the manufacturing method of the battery according to the example embodiment.
Figure 12:
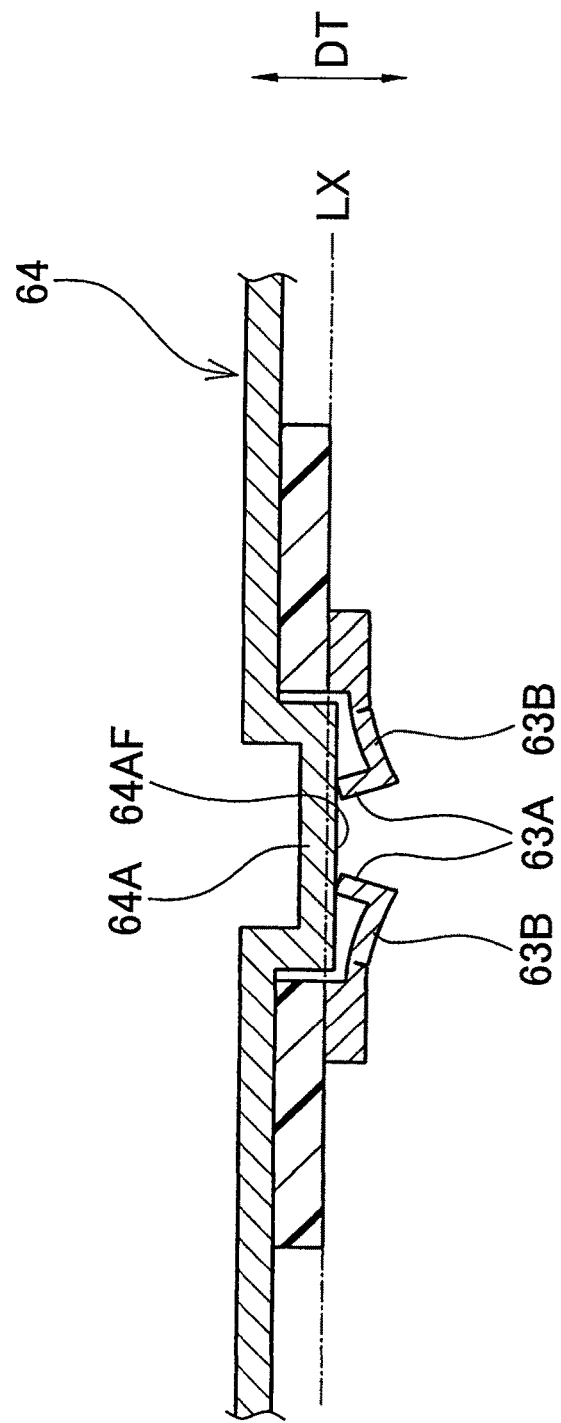
FIG. 12 is still another explanatory view of the abutting process in the manufacturing method of the battery according to the example embodiment.

For example, even if the main surface 64AF of the moving portion 64A of the diaphragm 64 is offset above the plane LX in the abutting direction because the bottom plate portion 66B of the enclosing member 66 is thick, the protruding portion 63A is able to reliably abut against the main surface 64AF of the moving portion 64A, so the protruding portion 63A is able to elastically abut against the moving portion 64A of the diaphragm 64, as shown in FIG. 11. Also, for example, conversely, even if the main surface 64AF of the moving portion 64A of the diaphragm 64 is offset below the plane LX in the abutting direction DT because the bottom plate portion 66B of the enclosing member 66 is thin, the protruding portion 63A is able to reliably abut against the main surface 64AF of the moving portion 64A, so the protruding portion 63A is able to elastically abut against the moving portion 64A of the diaphragm 64, as shown in FIG. 12.

Figure 13:
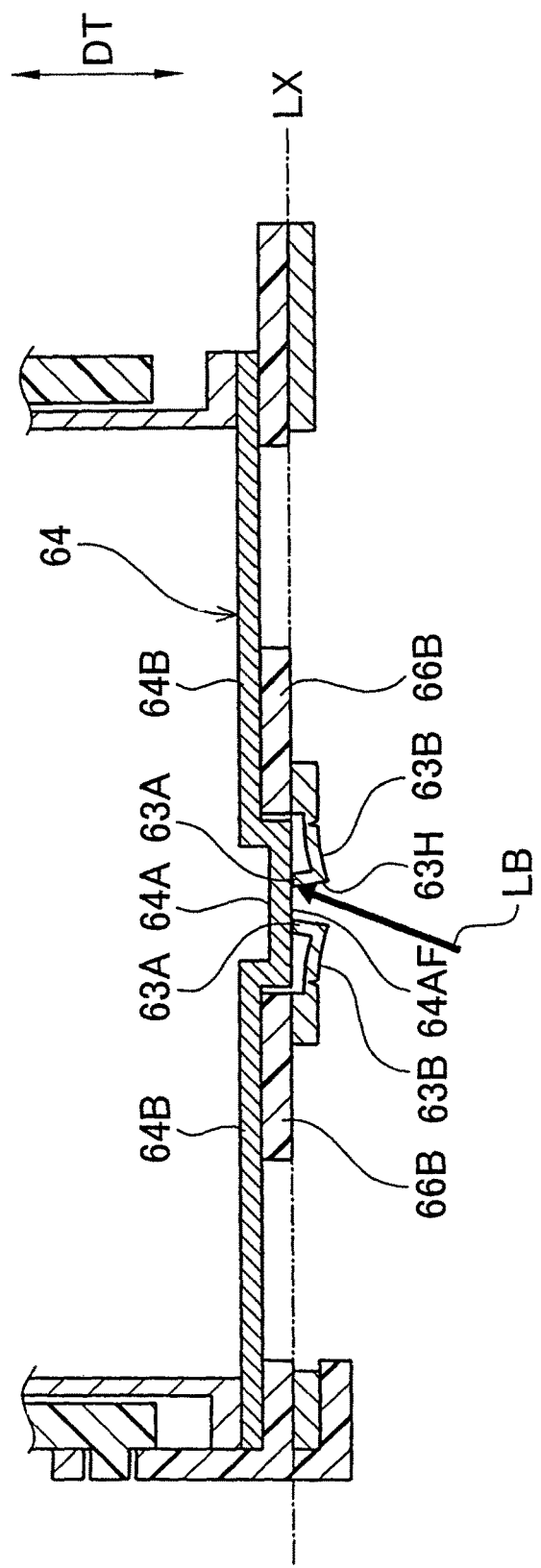
FIG. 13 is an explanatory view of a welding process in the manufacturing method of the battery according to the example embodiment.

After the abutting process described above, the protruding portion 63A and the moving portion 64A are welded together in a welding process by emitting a laser beam LB through the first through-hole 63H, while the protruding portion 63A is elastically abutted against the moving portion 64A of the diaphragm 64 (see FIG. 13). Thus, the protruding portion 63A is reliably joined to the moving portion 64A via a weld PT.

Next, the collector portion 63Y of the positive conductive member 63 is welded to the positive lead portion 28f of the positive plate 20 of the electrode body 10 (see FIG. 2). Meanwhile, after the negative internal terminal member 71 is welded to the negative plate 30 (i.e., the negative lead portion 38f) of the electrode body 10 by a well-known method, the negative terminal structure 70 described above is prepared by a well-known method (see FIG. 2). Then, the electrode body 10 is housed in the case main body member 81, and the case main body member 81 is sealed by the sealing lid 82. Further, electrolyte, not shown, is poured in from a pouring hole, not shown, in the sealing lid 82, after which the pouring hole is sealed, thus completing the battery 1 (see FIG. 1).

The manufacturing method of the battery 1 according to this example embodiment described above includes the abutting process and the welding process described above. Therefore, even if the protruding portion 63A and the moving portion 64A are offset in the abutting direction DT due to dimensional tolerance or the like of the members that form the current interrupting mechanism 62, this offset is absorbed so the protruding portion 63A of the positive conductive member 63 is able to abut against the moving portion 64A. Accordingly, the battery 1 in which the positive conductive member 63 and the diaphragm 64 are suitably welded using the laser beam LB that is an energy beam, is able to be manufactured. Moreover, the protruding portion 63A that protrudes from the exposed portion 63B is provided, so the portion of the positive conductive member 63 that abuts against the moving portion 64A is limited to this protruding portion 63A, and is thus able to be reliably abutted.

Also, the annular groove 68BG of the positive conductive member 63 has a circular shape, and the protruding portion 63A has a circular shape that is concentric with the annular groove 63BG, so the distance between the annular groove 63BG and the protruding portion 63A is able to be the same along the entire circumference. Therefore, when the internal pressure F in the battery case 80 rises and the protruding portion 63A separates from the moving portion 64A such that a fracture occurs in a portion of the annular groove 63BG, the annular groove 63BG is able to reliably fracture from there along the entire circumference. Thus, the battery 1 in which current that flows to the electrode body 10 is able to be reliably interrupted when the internal pressure F of the battery case 80 exceeds the operating pressure G is able to be manufactured.

Moreover, with the manufacturing method of the battery 1 according to this example embodiment, the first through-hole 63H is formed in the circular protruding portion 63A, so the protruding portion 63A is able to elastically move a large amount in the abutting direction DT of the protruding portion 63A and the moving portion 64A, compared with when a through-hole is not provided in the protruding portion 63A. Therefore, in the abutting process, the protruding portion 63A is able to be more reliably abutted against the moving portion 64A. Also, when the moving portion 64A is welded to the protruding portion 63A in the welding process, the state of the weld PT is able to be easily checked optically, e.g., visually, through this first through-hole 63H.

Figure 14:
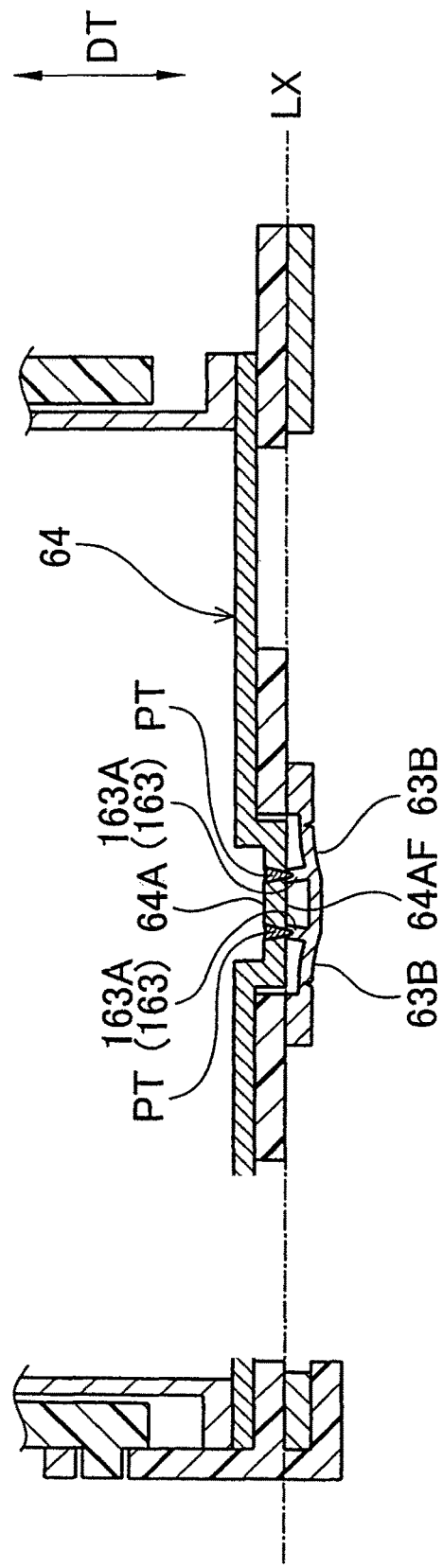
FIG. 14 is an explanatory view of a conductive member according to a modified example of the example embodiment.
Figure 15:
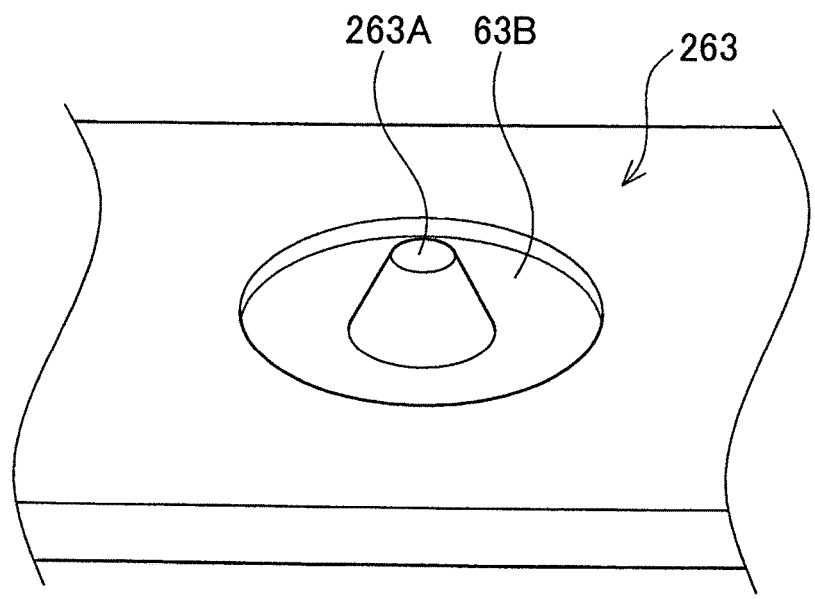
FIG. 15 is an explanatory view of a conductive member according to another modified example of the example embodiment.
Figure 16:
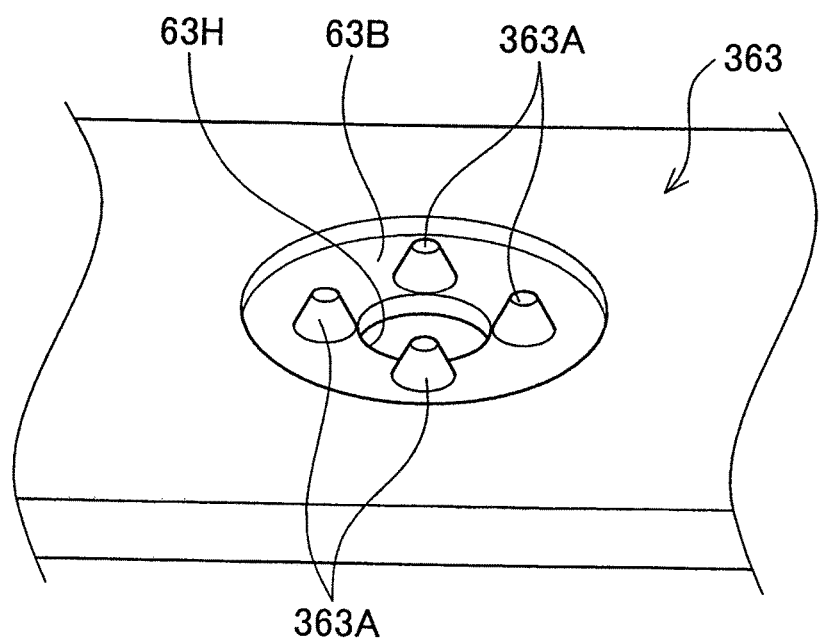
FIG. 16 is an explanatory view of a conductive member according to yet another modified example of the example embodiment.

While the invention has been described with reference to various example embodiments thereof, it is to be understood that the invention is not limited to the described embodiments but may be embodied with various changes, modifications or improvements, without departing from the scope of the invention. For example, in the example embodiment, the battery 1 in which the first through-hole 63H is formed in the circular protruding portion 63A is described. Alternatively, however, the battery may have a positive conductive member 163 in which a through-hole is not formed in a circular protruding portion 163A (see FIG. 14). Further, the positive conductive member 63 having the circular protruding portion 63A is described, but aside from this, a positive conductive member 263 having a protruding portion 263A in the center of the exposed portion 63B (see FIG. 15), or a positive conductive member 363 having a plurality of scattered protruding portions 363A (see FIG. 16) may be used, and these protruding portions may be welded to a moving portion, for example. Also, in the example embodiment, the exposed portion 63B that is depressed downward in FIG. 7 compared with the flat plate portion 63F around it is described, but an exposed portion that is depressed in the direction opposite the direction in which this exposed portion 63B is depressed may also be used.

The invention claimed is:

1. A sealed battery comprising:
   an electrode body including an electrode plate;
   a battery case that encloses the electrode body; and
   a current interrupting mechanism including a movable member and a conductive member, the movable member including a moving portion being configured to move with a rise in an internal pressure in the battery case, the conductive member being electrically connected to the electrode plate of the electrode body, and the current interrupting mechanism being configured to interrupt current that flows through the electrode body when the internal pressure in the battery case exceeds an operating pressure, wherein
   the conductive member includes a circular through-hole, and a protruding portion disposed at a peripheral edge of the circular through-hole so as to have a circular shape and surround the circular through-hole, wherein the protruding portion protrudes toward the moving portion;
   a weld made by energy beam welding is interposed between the protruding portion and the moving portion;
   the conductive member has an annular groove having a circular shape and that is concentric around the protruding portion that is disposed at the peripheral edge of the circular through-hole, the annular groove is configured to fracture in an annular shape surrounding the weld when the internal pressure exceeds the operating pressure; and
   the protruding portion is configured to elastically push against the moving portion via the weld.

2. A manufacturing method for a sealed battery, the sealed battery including:
   an electrode body including an electrode plate;
   a battery case that encloses the electrode body; and
   a current interrupting mechanism including a movable member and a conductive member, the movable member including a moving portion being configured to move with a rise in an internal pressure in the battery case, the conducting member being electrically connected to the electrode plate of the electrode body, and the current interrupting mechanism being configured to interrupt current that flows through the electrode body when the internal pressure in the battery case exceeds an operating pressure, the conductive member including a circular through-hole, and a protruding portion disposed at a peripheral edge of the circular through-hole so as to have a circular shape and surround the circular through-hole, wherein the protruding portion protrudes toward the moving portion;
   a weld made by energy beam welding being interposed between the protruding portion and the moving portion, and
   the conductive member having an annular groove having a circular shape and that is concentric around the protruding portion that disposed at the peripheral edge of the circular through-hole, the annular groove being configured to fracture in an annular shape surrounding the weld when the internal pressure exceeds the operating pressure,
   the manufacturing method comprising:
   elastically abutting the protruding portion against the moving portion; and welding the moving portion to the protruding portion by emitting the energy beam at the protruding portion.

3. The sealed battery according to claim 1, wherein the protruding portion is configured to elastically push against the moving portion before the weld is interposed therebetween.

4. The manufacturing method according to claim 2, wherein the protruding portion is elastically abutted against the moving portion before the welding.

\* \* \* \* \*